(12) United States Patent
Hsu

(10) Patent No.: US 11,599,766 B2
(45) Date of Patent: Mar. 7, 2023

(54) BIOLOGICAL SAMPLE STORAGE CONTAINER AND DUAL CHIP WIRELESS IDENTIFICATION TAG THEREOF

(71) Applicant: Yangzhou YoungTek Electronics, Ltd., Jiangsu (CN)

(72) Inventor: Yung-Tao Hsu, Hsinchu (TW)

(73) Assignee: YANGZHOU YOUNGTEK ELECTRONICS, LTD., Jiangsu (CN)

( * ) Notice: Subject to any disclaimer, the term of this patent is extended or adjusted under 35 U.S.C. 154(b) by 91 days.

(21) Appl. No.: 17/016,748

(22) Filed: Sep. 10, 2020

(65) Prior Publication Data

US 2021/0201106 A1  Jul. 1, 2021

(30) Foreign Application Priority Data

Dec. 31, 2019 (TW) ................. 108217472

(51) Int. Cl.
*G06K 19/077* (2006.01)
*G06K 19/07* (2006.01)

(52) U.S. Cl.
CPC ... *G06K 19/07773* (2013.01); *G06K 19/0725* (2013.01)

(58) Field of Classification Search
CPC ......... G06K 19/07773; G06K 19/0725; G06K 19/072

See application file for complete search history.

(56) References Cited

U.S. PATENT DOCUMENTS

| | | | |
|---|---|---|---|
| 10,402,711 B1* | 9/2019 | Yamamoto | G06K 19/0723 |
| 10,726,219 B1* | 7/2020 | Yaqub | G07F 7/0893 |
| 2020/0371271 A1* | 11/2020 | Palomares | G06K 19/07766 |
| 2020/0380329 A1* | 12/2020 | Lin | H01Q 5/335 |

* cited by examiner

*Primary Examiner* — Sonji N Johnson
(74) *Attorney, Agent, or Firm* — Li & Cai Intellectual Property (USA) Office

(57) ABSTRACT

A biological sample storage container and a dual chip wireless identification tag thereof are provided. The dual chip wireless identification tag includes a substrate, an antenna structure, a first chip, and a second chip. The antenna structure is disposed on the substrate, and includes two radiation parts and two matching parts. The two matching parts are connected between the two radiation parts, the first chip is coupled to one of the matching parts, and the second chip is coupled to the other one of the matching parts.

6 Claims, 6 Drawing Sheets

BIOLOGICAL SAMPLE STORAGE CONTAINER AND DUAL CHIP WIRELESS IDENTIFICATION TAG THEREOF

CROSS-REFERENCE TO RELATED PATENT APPLICATION

This application claims the benefit of priority to Taiwan Patent Application No. 108217472, filed on Dec. 31, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless identification tag, and more particularly to a dual chip wireless identification tag and a biological sample storage container using the dual chip wireless identification tag.

BACKGROUND OF THE DISCLOSURE

To facilitate the management of items, a barcode is generally attached to a storage device, which contains relevant information of the stored items. However, if the incorrect information is input into the barcode, there will be no way to verify if the information belongs to the item that is being used, which can result in accidental of misusage. For instance, when the barcode on a blood bag is wrong, a mistake may occur when performing a blood transfusion, which may cause irreparable accidents. In addition, the barcode cannot quickly identify a target object among a large quantity of storage devices.

Radio-frequency identification (RFID) technology is a "non-contact" automatic identification technology that transmits radio waves within a distance of several centimeters to several meters, and the information stored in the RFID tag can be read, so as to identify the content of the item or an identity of a person represented by an electronic tag. RFID tags are similar in function to smart cards or IC chip cards, but they have a larger memory capacity and a much smaller size, so they can be used to replace conventional fixed or contact identification tags.

However, conventional RFID tags generally use a chip and a set of antennas. When the chip is damaged, internal data cannot be accessed, so that data loss easily occurs. In addition, the conventional RFID tags mostly use anisotropic conductive adhesive to combine the chip and the antenna. This structure cannot be used in extreme environments (such as −195° C.), that is, a connection between the chip and the antenna is prone to failure in the extreme environment.

SUMMARY OF THE DISCLOSURE

In response to the above-referenced technical inadequacies, the present disclosure provides a dual chip wireless identification tag and a biological sample storage container using the dual chip wireless identification tag.

In one aspect, the present disclosure provides a dual chip wireless identification tag, which includes a substrate, an antenna structure, a first chip, and a second chip. The antenna structure is disposed on the substrate and includes two radiation parts and two matching parts. The two matching parts are connected between the two radiation parts and are separated from each other. Each of the matching parts includes two first matching sections, a second external matching section, and a second internal matching section, the two first matching sections are respectively connected to the two radiation parts, and the second external matching section and the second internal matching section are connected between the two first matching sections. A width of each of the first matching sections is larger than widths of the second external matching section and the second internal matching section. The first chip is coupled to the second external matching section of one of the matching parts, and the second chip is coupled to the second external matching section of the other matching part.

In another aspect, the present disclosure provides a biological sample storage container including a container body and a dual chip wireless identification tag. The dual chip wireless identification tag is disposed on the container body and includes a substrate, an antenna structure, a first chip, and a second chip. The antenna structure is disposed on the substrate and includes two radiation parts and two matching parts. The two matching parts are connected between the two radiation parts and are separated from each other. Each of the matching parts includes two first matching sections, a second external matching section, and a second internal matching section, the two first matching sections are respectively connected to the two radiation parts, and the second external matching section and the second internal matching section are connected between the two first matching sections. A width of each of the first matching sections is larger than widths of the second external matching section and the second internal matching section. The first chip is coupled to the second external matching section of one of the matching parts, and the second chip is coupled to the second external matching section of the other matching part.

In certain embodiments, the width of each of the first matching sections is 6 to 8 times any one of the widths of the second external matching section and the width of the second internal matching section.

In certain embodiments, the second external matching section of each of the two matching parts has a central area that is concave in shape, wherein each of the two central areas has two electrical contacts for coupling the first chip and the second chip.

In certain embodiments, two electrodes of the first chip or the second chip are respectively connected to the two electrical contacts of the corresponding central area through a eutectic layer.

In certain embodiments, each of the radiation parts includes a radiation body, and a first branch and a second branch extending from one side of the radiation body, wherein the two first matching sections of one of the matching parts are respectively connected to the two first branches, and the two first matching sections of the other matching part are respectively connected to the two second branches.

In certain embodiments, the first branches and the second branches have a continuously bent shape.

One of the advantages of the present disclosure, by virtue of "the first chip is coupled to the second external matching section of one of the matching parts, and the second chip is coupled to the second external matching section of the other matching part" and "the width of each of the first matching sections is larger than widths of the second external matching section and the second internal matching section", dual chips of the dual chip wireless identification tag can operate under the condition of having a single antenna.

Further, the dual chip wireless identification tag of the present disclosure can be applied to the biological sample storage containers, and if one of the chips malfunctions or is damaged, another chip can still write and read data separately, so that data of biological samples (such as blood, biological tissue, cells, or body fluids) can be stored safely under the storage environment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
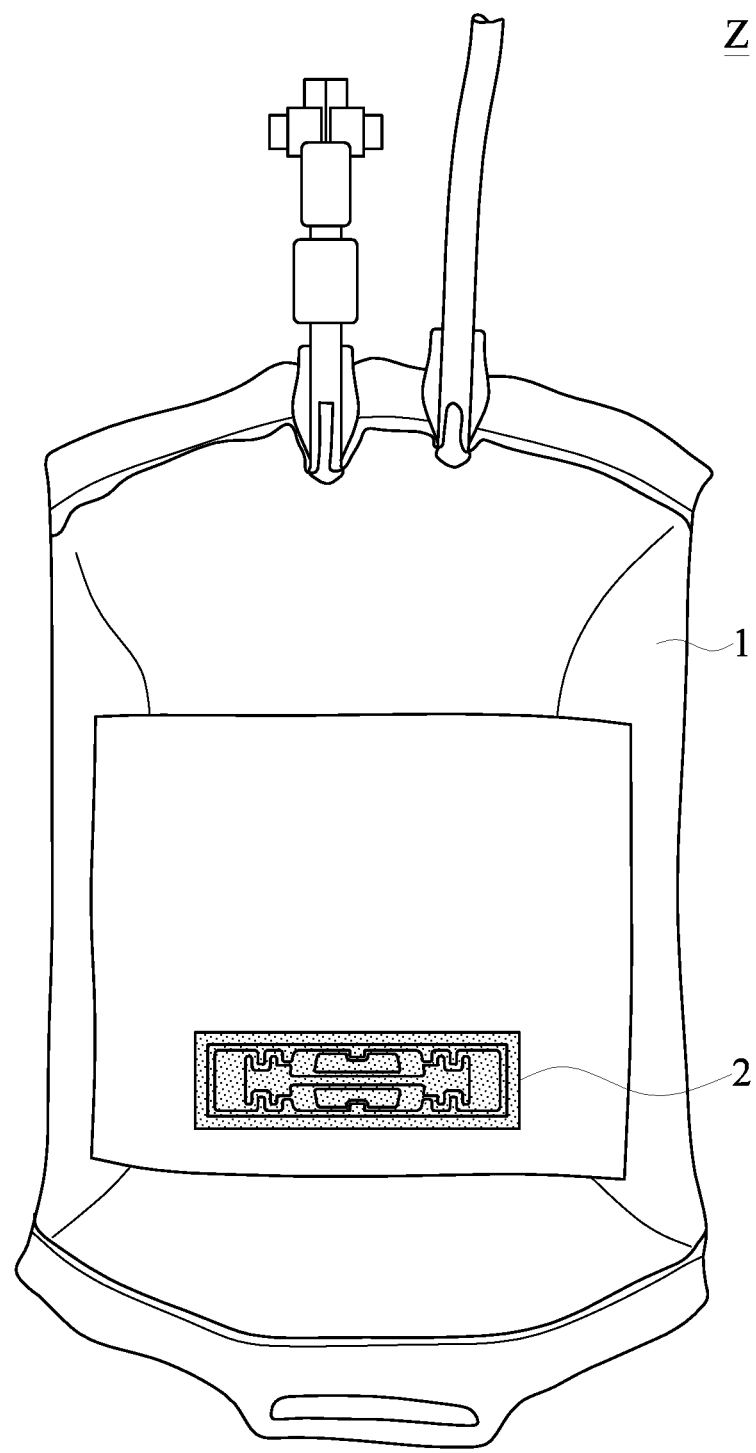
FIG. 1 is a schematic view of a biological sample storage container of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
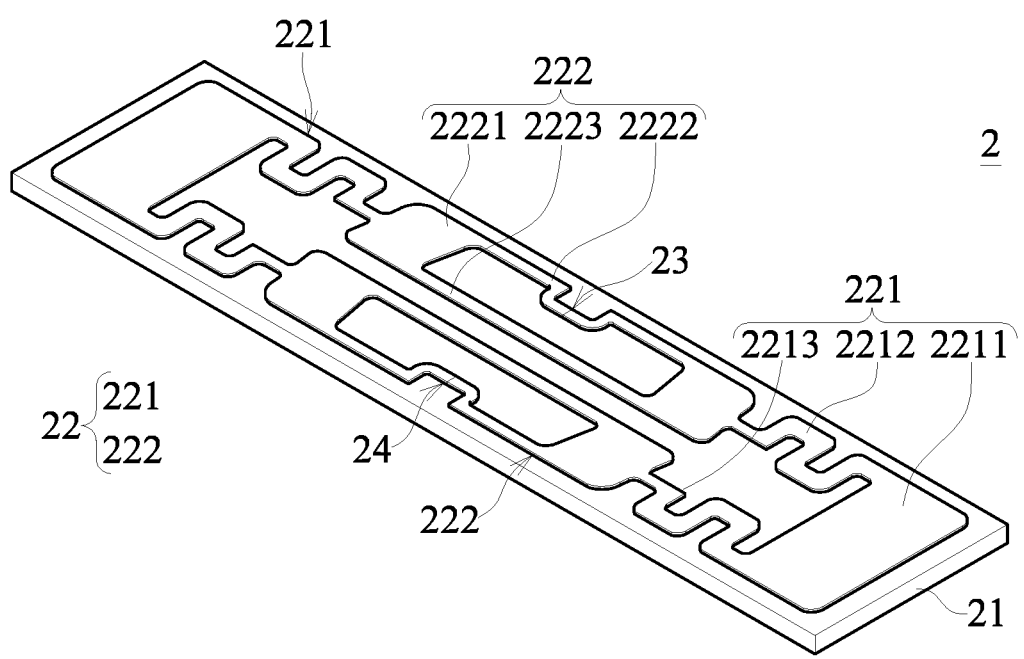
FIG. 2 is a perspective schematic view of a dual chip wireless identification tag of the present disclosure.
Figure 3:
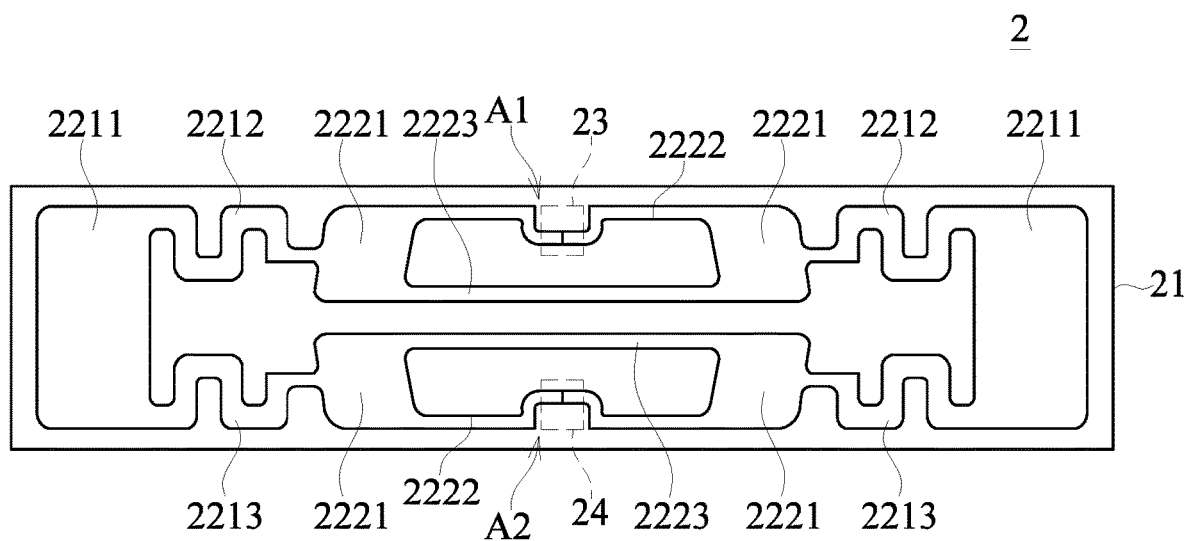
FIG. 3 is a planar schematic view of the dual chip wireless identification tag of the present disclosure.

Referring to FIG. 1 to FIG. 3, the present embodiment provides a biological sample storage container Z. The biological sample storage container Z is illustrated as a storage container for blood (i.e., a blood transfusion bag) in FIG. 1, but is not limited thereto. In certain embodiments, the biological sample storage container Z can be the storage container for biological tissue, cells, or body fluids.

The biological sample storage container Z includes a container body 1 and a dual chip wireless identification tag 2 attached to the container body 1. The container body 1 is used to store blood, and the dual chip wireless identification tag 2 uses two chips to store blood data such as blood type and personal data of a blood donor at the same time. In order to adapt to a storage environment for the blood, a material of the container body 1 can be aluminum nitride or polypropylene (PP) to improve low temperature resistance, but it is not limited thereto.

In use, the dual chip wireless identification tag 2 can be identified by an RFID reader to confirm whether the blood data is consistent with a patient data, thereby avoiding accidentally administering blood transfusion with wrong blood. It is worth mentioning that even if one of the chips of the dual chip wireless identification tag 2 malfunctions or is damaged, another chip can still write and read data separately, so as to ensure that the data can be stored safely.

Referring to FIG. 2 and FIG. 3, the dual chip wireless identification tag 2 includes a substrate 21, an antenna structure 22, a first chip 23, and a second chip 24. The antenna structure 22, the first chip 23, and the second chip 24 are all disposed on the substrate 21, and the antenna structure 22 can simultaneously drive the first chip 23 and the second chip 24 to operate. In this embodiment, the substrate 21 can have good support and flexibility to adapt to different three-dimensional shapes of the container body 1, so that the substrate 21 can be attached flatly to an outer surface of the container body 1. A material of the substrate 21 can be polyester, preferably polyethylene terephthalate (PET).

Further, the antenna structure 22 can be formed by screen printing, but is not limited herein. The antenna structure 22 includes two radiation parts 221 and two matching parts 222, and the two matching parts 222 are connected between the two radiation parts 221 and separated from each other. In this embodiment, each radiation part 221 includes a radiation body 2211 and a first branch 2212 and a second branch 2213 extending from one side of the radiation body 221, and extending directions of the first branch 2212 and the second branch 2213 are approximately parallel and present a continuously bent shape.

In addition, each matching part 222 includes two first matching sections 2221, a second external matching section 2222, and a second internal matching section 2223, the two first matching sections 2221 are respectively connected to the two radiation parts 221, and the second external matching section 2222 and the second internal matching section 2223 are connected between the two first matching sections 2221. Furthermore, the two first matching sections 2221, the second external matching section 2222, and the second internal matching section 2223 form a closed loop, the second external matching section 2222 is close to a periphery of the substrate 21, and the second internal matching section 2223 is away from the periphery of the substrate 21.

Moreover, referring to FIG. 2 and FIG. 3, the two first matching sections 2221 of one of the matching parts 222 are respectively connected to the two first branches 2212, and the two first matching sections 2221 of the other matching part 222 are respectively connected to the two second branches 2213. In addition, the first chip 23 is coupled to the second external matching section 2222 of one of the matching parts 222, and the second chip 24 is coupled to the second external matching section 2222 of the other matching part 222. It is worth mentioning that a width of the first matching section 2221 is larger than widths of the second external matching section 2222 and the second internal matching section 2223. Preferably, the width of the first matching section 2221 is 6 to 8 times any one of the widths of the second external matching section 2222 and the width of the second internal matching section 2223, more preferably between 7 and 8 times. Therefore, a read-write sensitivity and read-write distance of the first chip 23 and the second chip 24 can be improved.

Figure 4:
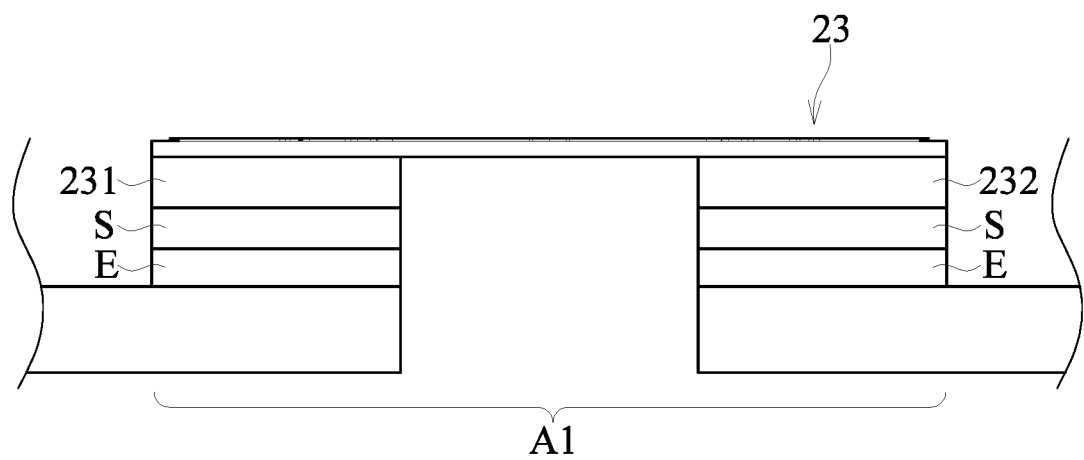
FIG. 4 is a partial schematic view of the dual chip wireless identification tag of the present disclosure.
Figure 5:
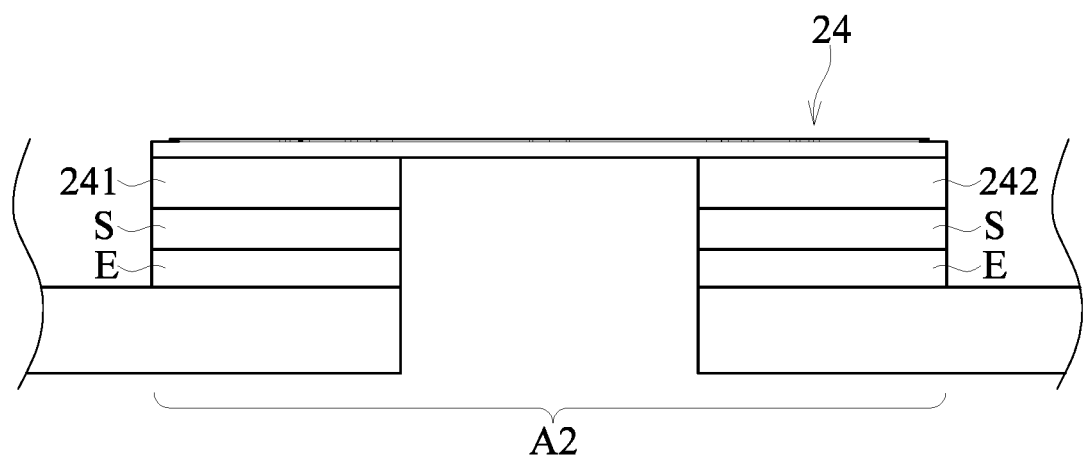
FIG. 5 is another partial schematic view of the dual chip wireless identification tag of the present disclosure.

Referring to FIG. 4 to FIG. 5, which is to be read in conjunction with FIG. 3, the present disclosure uses a eutectic bonding method instead of anisotropic conductive glue to fix the first chip 23 and the second chip 24 on the antenna structure 22, respectively. Further, in the antenna structure 22, the second external matching section 2222 of the two matching parts 222 each has a central area A1, A2 with a concave shape, and the two central areas A1 and A2 each have two electrical contacts E. Two electrodes 231 and 232 of the first chip 23 are respectively connected to the two electrical contacts E of the central area A1 through a eutectic layer S, as shown in FIG. 4. Two electrodes 241 and 242 of the second chip 24 are also respectively connected to the two electrical contacts E of the central area A2 through the eutectic layer S, as shown in FIG. 5. Therefore, a connection between the first chip 23, the second chip 24, and the antenna structure 22 is more stable and reliable, so as to prevent failure in extreme environments.

Figure 6:
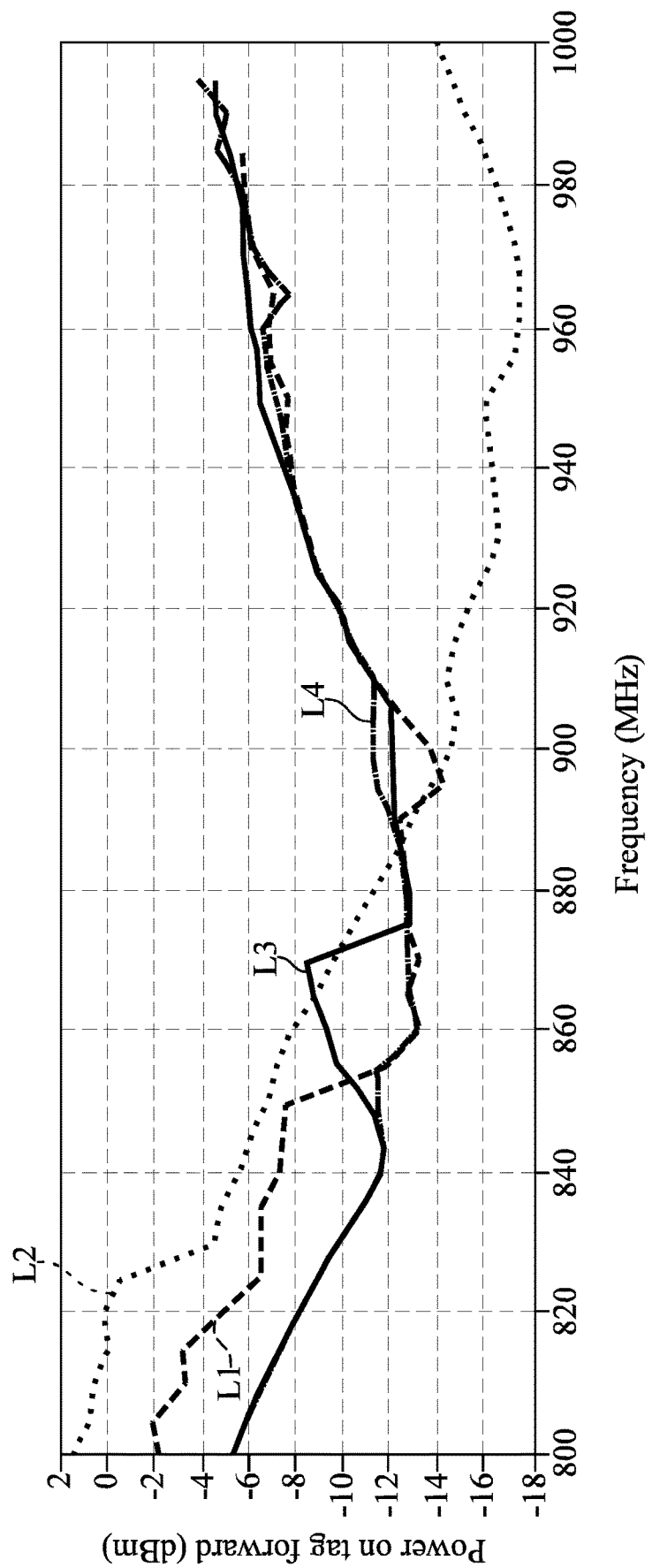
FIG. 6 is a diagram showing a sensitivity test result of the dual chip wireless identification tag of the present disclosure.

Referring to FIG. 6, which shows the test results of the dual chip wireless identification tag 2 of the present disclosure, and the test conditions include Voyanic test standards. The dual chip wireless identification tag 2 is placed vertically and the test distance is 50 cm. Segment L1 shows sensitivity of the first chip 23 and the second chip 24 at the same time, and the most preferred sensitivity is −13 dBm. Segment L2 shows the sensitivity of subtracting the first chip 23 or the second chip 24, and the sensitivity is −17 dBm before the −960 MHz frequency point. Segment L3 and segment L4 respectively present the sensitivity of testing the first chip 23 or the second chip 24 separately. It can be observed that the dual chip wireless identification tag 2 of the present disclosure can be read normally regardless of the normal operation of the dual chip or the operation of only one single chip.

The Advantages of the Embodiments

One of the advantages of the present disclosure is that, by virtue of "the first chip is coupled to the second external matching section of one of the matching parts, and the second chip is coupled to the second external matching section of the other matching part" and "the width of each of the first matching sections is larger than widths of the second external matching section and the second internal matching section", dual chips of the dual chip wireless identification tag can operate under the condition of having a single antenna.

Further, the dual chip wireless identification tag of the present disclosure can be applied to the biological sample storage container, and if one of the chips malfunctions or is damaged, another chip can still write and read data separately, so that data of biological samples (such as blood, biological tissue, cells or body fluids) can be stored safely under the storage environment.

The present disclosure uses eutectic bonding instead of anisotropic conductive glue to fix the first chip and the second chip on the antenna structure respectively. Therefore, the connection between the first chip, the second chip, and the antenna structure is more stable and reliable, so as to prevent failure in extreme environments.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual chip wireless identification tag, comprising:
  a substrate;
  an antenna structure disposed on the substrate and including two radiation parts and two matching parts, wherein the two matching parts are connected between the two radiation parts and are separated from each other, wherein each of the matching parts includes two first matching sections, a second external matching section, and a second internal matching section, wherein the two first matching sections are respectively connected to the two radiation parts, and the second external matching section and the second internal matching section are connected between the two first matching sections, and wherein a width of each of the first matching sections is larger than widths of the second external matching section and the second internal matching section;
  a first chip coupled to the second external matching section of one of the matching parts; and
  a second chip coupled to the second external matching section of another one of the matching parts.

2. The dual chip wireless identification tag according to claim 1, wherein the width of each of the first matching sections is 6 to 8 times any one of the width of the second external matching section and the width of the second internal matching section.

3. The dual chip wireless identification tag according to claim 1, wherein the second external matching section of each of the two matching parts has a central area which is concave in shape, wherein each of the two central areas has two electrical contacts for coupling the first chip and the second chip.

4. The dual chip wireless identification tag according to claim 3, wherein two electrodes of the first chip or the second chip are respectively connected to the two electrical contacts of the corresponding central area through a eutectic layer.

5. The dual chip wireless identification tag according to claim 1, wherein each of the radiation parts includes a radiation body, and a first branch and a second branch that extend from one side of the radiation body, wherein the two first matching sections of one of the matching parts are respectively connected to the two first branches, and the two first matching sections of another one of the matching parts are respectively connected to the two second branches.

6. The dual chip wireless identification tag according to claim 5, wherein the first branches and the second branches have meandering shapes.

* * * * *